United States Patent

Hachisuka et al.

[11] Patent Number: 5,598,430
[45] Date of Patent: Jan. 28, 1997

[54] ANALOG/DIGITAL RECEIVER

[75] Inventors: Yumi Hachisuka, Matsudo; Kiyoshi Tanaka, Chiba, both of Japan

[73] Assignee: Uniden Corporation, Chiba, Japan

[21] Appl. No.: 359,384

[22] Filed: Dec. 20, 1994

[30] Foreign Application Priority Data

Nov. 15, 1994 [JP] Japan .................................. 6-280966

[51] Int. Cl.⁶ .............................. H04L 25/00; H04L 27/00
[52] U.S. Cl. ........................ 375/216; 375/217; 455/67.1
[58] Field of Search .................................. 375/216, 217; 455/67.1, 89, 33.1, 54.1, 127

[56] References Cited

U.S. PATENT DOCUMENTS

| | | | |
|---|---|---|---|
| 4,817,192 | 3/1989 | Phillips et al. | 375/344 |
| 5,151,922 | 9/1992 | Weiss | 375/217 |
| 5,483,686 | 1/1996 | Saka et al. | 375/216 |

FOREIGN PATENT DOCUMENTS 2-154534  6/1990  Japan .

*Primary Examiner*—Stephen Chin
*Assistant Examiner*—Hai H. Phan
*Attorney, Agent, or Firm*—Lowe, Price, LeBlanc & Becker

[57] ABSTRACT

An analog/digital receiver comprises a noise detecting circuit for checking whether a noise component, output from an analog signal detecting means, is not less than a specified value, and an RSSI detecting circuit for checking whether received signal strength, output from the receiver, is not less than a specified value. A discriminating circuit is included for making a determination as to whether the received input is an analog modulation signal or a digital modulation signal according to the result of the determination made by the noise detecting circuit as well as by the RSSI detecting circuit. A select switch selects the output from either the digital signal detecting circuit or the analog signal detecting circuit.

8 Claims, 8 Drawing Sheets

| No | noise detecting circuit | RSSI detecting circuit | determination |
|---|---|---|---|
| 0 | not detected | not detected | no signal |
| 1 | detected | not detected | analog signal |
| 2 | not detected | detected | digital signal |
| 3 | detected | detected | analog signal |

ANALOG/DIGITAL RECEIVER

This patent application is the subject of a submission under the Disclosure Document Program, which was filed thereunder by applicants on Aug. 1, 1994 and identified as Disclosure Document No. 358786 with its accompanying fee paid under the provisions of all the Rules and Regulations including 37 CFR §1.21(c).

FIELD OF THE INVENTION

The present invention relates to a radio receiver, and more particularly to an analog/digital receiver which can make a determination at a high speed as to whether a received input signal is an analog modulation signal or a digital modulation signal, and more specifically to an analog/digital receiver which can make such a determination when executing a high speed channel scan.

BACKGROUND OF THE INVENTION

In a conventional type of radio receiver, it is not easy to make a determination as to whether a received signal is an analog modulation signal or a digital modulation signal. An analog/digital receiver which can automatically discriminate between analog modulation and analog modulation and output a demodulation signal corresponding to an incoming signal is disclosed, for instance, in Japanese Patent Laid Open Publication No. 154534/1990.

The analog/digital receiver disclosed in Japanese Patent Laid Open Publication No. 154534/1990 comprises a radio receiving section which converts a received signal first to a signal having an intermediate frequency and then amplifies the signal, or directly amplifies the received signal, an analog demodulating section as well as a digital demodulating section each connected in parallel to an output terminal of the radio receiver, and a switch which switches output from the analog demodulating section as well as from the digital demodulating section, converts the electric signal output from the switch to sound at a sound convert section and outputs the sound.

Also provided in the digital demodulating section is a detecting section for detecting the presence of a synchronizing signal, switching the switch to the output of the digital demodulating section when a synchronizing signal is detected in the detecting section, and disconnecting the output from the analog demodulating section.

With the configuration as described above, even if an analog modulation signal or a digital modulation signal is received at random, which type signal is received, an analog modulation signal or a digital modulation signal, is automatically discriminated, and the output from a demodulator correctly corresponding to the input signal is outputted.

As described above, in the conventional type of analog/digital receiver, the presence of a synchronizing signal is detected by a detecting section provided in a digital demodulating section to determinate as to whether a receiving input is an analog modulation signal or a digital modulation signal, and generally when demodulating a digital modulated signal, a long time is required for detection because determination is difficult unless the received data is demodulated by regenerating the clock. As a result, a disadvantageously long time is required until, e.g., an aural signal is output.

Also when receiving signals for many channels within a short period of time in a scanner receiver, the conventional technology as described above is not suited to, and is not practically available for, receiving and detecting a digital demodulated signal.

SUMMARY OF THE INVENTION

It is an object of the present invention to provide an analog/digital receiver which can make a determination at a high speed as to whether a received input is an analog modulation signal or a digital modulation signal.

It is another object of the present invention to provide an analog/digital receiver which can make a determination at a high speed as to whether an received input is a digital modulation signal or a analog modulation signal even in a receiver executing a high speed channel scan.

In an analog/digital receiver according to the present invention, detection of a digital signal outputted from a receiving means by a digital signal detecting means and detection of an analog signal from the receiving means by an analog signal detecting means are executed in parallel in the receiving means. This is accomplished by receiving an incoming signal and converting the frequency thereof with the receiving means or directly amplifying the frequency of the incoming signal for output. A determination as to whether a noise component is more than a specified value or not in output from the analog signal detecting means is performed by a noise detecting means, and a determination as to whether the amplitude of the incoming signal is more than a specified value or not as output from the receiving means is performed by an RSSI detecting means. A determination as to whether the received input is an analog modulation signal or a digital modulation signal is determined by a discriminating means based on the result of the detection by the noise detecting means as well as by the RSSI detecting means. Either one of output from the digital signal detecting means and that from the analog signal detecting means is selected by a switching means according to the determination by the discriminating means.

As described above, a noise component as output from the analog signal detecting means and the amplitude of a receiving signal are detected by the noise detecting means and the RSSI detecting means respectively. Determination as to whether a received input signal is an analog modulation signal or a digital modulation signal is produced according to combination of the result of detection by the noise detecting means and that by the RSSI detecting means. This is not a determination according to a digital modulation signal as in the conventional technology. Thus, even if an analog modulation signal or a digital modulation signal is received at random, an analog/digital receiver according to the present invention can automatically discriminate the input signal at a high speed with a simple configuration and select an output from a signal detecting section correctly corresponding to the received signal. Also, a determination as to whether an incoming signal is a digital modulation signal or an analog modulation signal can be executed at a high speed even in a receiver executing high speed channel scan.

In an analog/digital receiver according to the present invention, a determination as to whether a noise component in output from an analog signal detecting means is more than a specified value or not is performed by a noise detecting means, a determination as to whether a received input is an analog modulation signal or a digital modulation signal or as to whether the amplitude of the received signal is more than a specified value or not is performed by a discriminating means based on detection by the noise detecting means as well as by an RSSI means. Output from a digital signal detecting means or an analog signal detecting means is selected by a switching means according to the result of the determination described above. The presence of a signal having a frequency lower than a specified one among signals subjected to analog signal detection output from the receiving means is executed by a low speed data signal detecting means because it is difficult to discriminate a low speed data from an aural signal by the noise detecting means. An oscillation frequency by a local oscillating means in the receiving means is controlled by a control means according to the result of determination by the low speed data signal detecting means and/or by the discriminating means.

For this reason, determination as to whether a received input carrying low speed data is an analog modulation signal or a digital modulation signal can automatically be discriminated at a high speed with a simple configuration, even if received at random, and thus signal detection correctly corresponding to a receiving signal is performed.

Other objects and features of this invention will become understood from the following description with reference to the accompanying drawings.

DESCRIPTION OF THE PREFERRED EMBODIMENT

Detailed description is made hereinafter for the analog/digital receiver according to the present invention in the order of [Embodiment 1] and [Embodiment 2] with reference to the related drawings.

Figure 1:
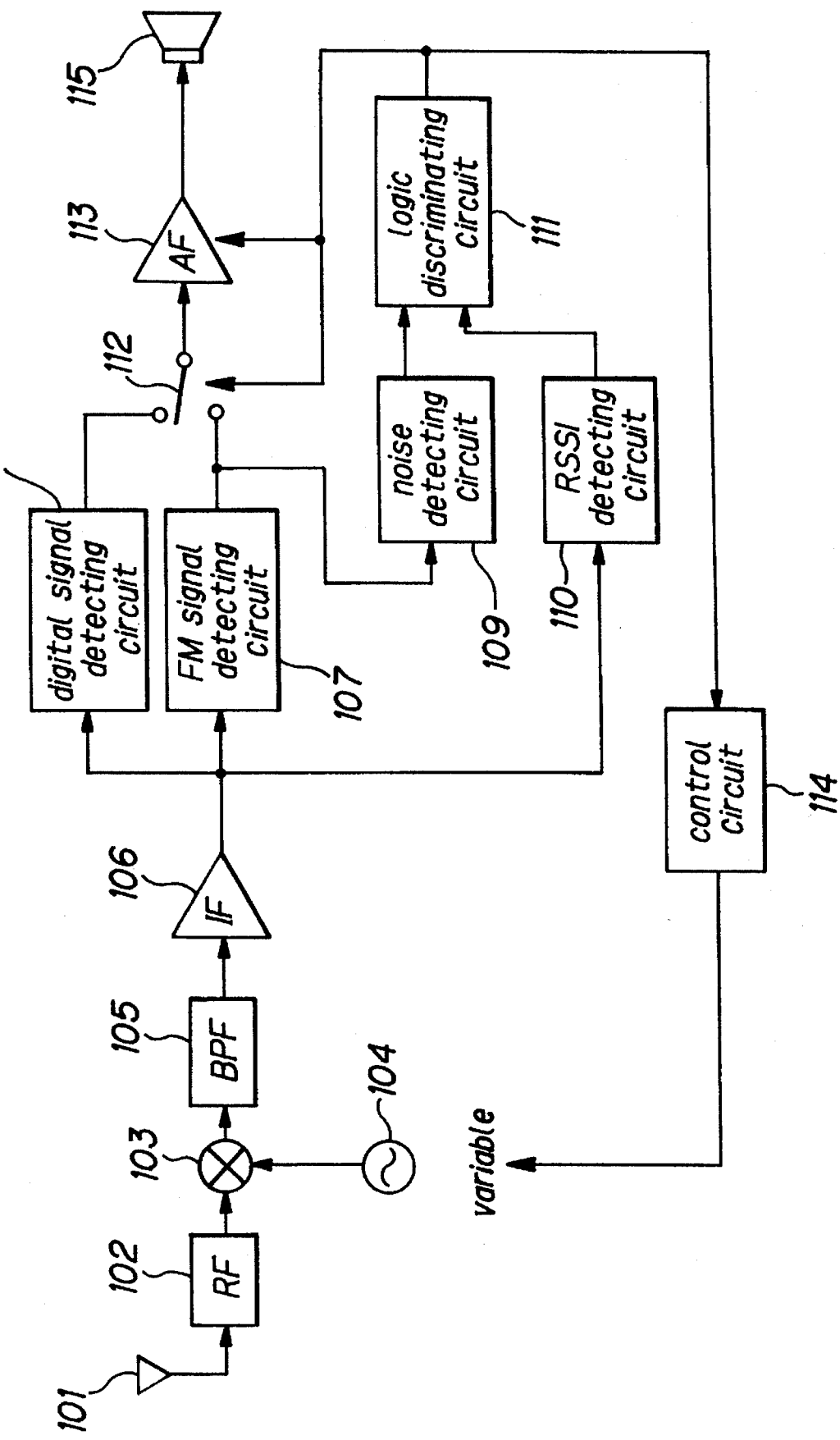
FIG. 1 is a block diagram of an analog/digital receiver according to Embodiment 1 of the present invention.

FIG. 1 is a block diagram of an analog/digital receiver according to Embodiment 1 of the present invention. In this figure, the analog/digital receiver according to the present invention comprises a receiving means, a digital detecting circuit (digital detector) 108, an FM signal detecting circuit (analog detector) 107, a noise detecting circuit (noise detector) 109, an RSSI detecting circuit (RSSI detector) 110, a logic discriminating circuit (discriminator) 111, a select switch (selector) 112, an aural frequency amplifier (AF) 113, a control circuit (controller) 114, and a speaker 115.

It should be noted that the receiving means, which receives a signal and outputs it after frequency conversion or direct amplification, comprises an antenna 101, a receiving circuit (RF) 102, a mixer 103, a local oscillator (local oscillator) 104 in which an oscillation frequency is controlled under control by the control circuit 114, a band pass filter (BPF) 105, and an intermediate frequency amplifier (IF) 106.

The digital signal detecting circuit 108 and FM signal detecting circuit 107 are connected to each other in parallel with reference to the output from the receiving means. The digital signal detecting circuit 108 detects a digital signal output from the receiving means, while the FM signal detecting circuit 107 detects an FM signal output from the receiving means.

The noise detecting circuit 109 detects whether a noise component output from the FM signal detecting circuit 107 is not less than a specified value. For instance, the noise detecting circuit 109 may comprise a squelch circuit or may have a band pass filter for detecting noise to make the cut-off frequency of the noise detecting circuit variable. The RSSI detecting circuit 110 checks whether an instruction for the strength of the received signal (RSSI), output from the receiving means, is not less than a specified value.

The logic discriminating circuit 111 makes a determination as to whether the received input is an analog modulation signal or a digital modulation signal according to the result of detection by the noise detecting circuit 109 as well as by the RSSI detecting circuit 110. As shown in the table in FIG. 2, whether the received input is an analog modulation signal or a digital modulation signal can be checked according to combinations of these two types of result of detection, so that the logic discriminating circuit may be realized with a logic circuit which can process the combinations.

The select switch 112 selects either the output from the digital signal detecting circuit 108 or the output from the FM signal detecting circuit 107 according to the result of the determination by the logic discriminating circuit 111. The selected output of signal detection is supplied through the aural frequency amplifier 113 to the speaker 115. It should be noted that the result of the determination by the logic discriminating circuit 111 is also supplied to the aural frequency amplifier 113 for switching the analog/digital circuit.

The control circuit 114 controls an oscillation frequency of the local oscillator 104 in the receiving means according to the result of the determination by the logic discriminating circuit 111.

Next description is made for a basic reason why it is possible to make a determination as to whether the received input is an analog modulation signal or a digital modulation signal by detecting a noise component in the output from the FM signal detecting circuit 107 in the noise detecting circuit 109 as well as by detecting the strength of the received signal in the RSSI detecting circuit 110.

Figures 2, 3:
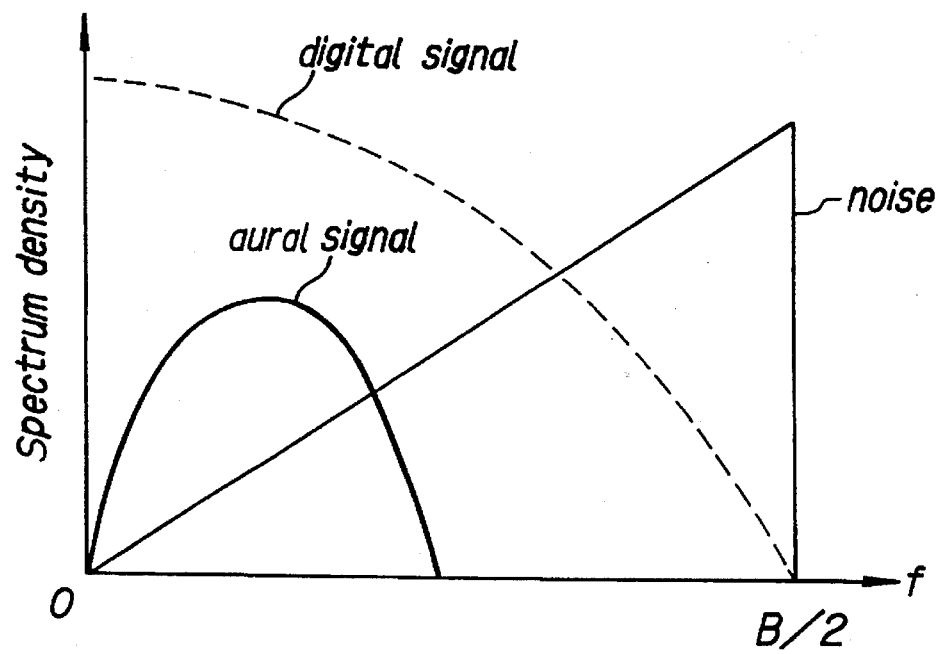
FIG. 2 is a chart for explanation of a logic combination for making a determination as to the result of detection by a noise detecting circuit and an RSSI detecting circuit in a logic discriminating circuit according to the embodiment.
FIG. 3 shows the spectrum characteristics of noise, an aural signal and a digital signal after frequency detection.

Assuming that the received bandwidth is B, generally the spectrum characteristics of noise after frequency detection is so-called the triangular noise characteristics in which the receiving bandwidth increases in proportion to a frequency f up to band B/2, as shown in FIG. 3. This noise is in inverse proportion to the receiving signal vs noise ratio (CNR), so that an aural spectrum after demodulation is cut off. For this reason, generally a squelch circuit detecting the presence of a signal by removing low frequency through a high pass filter (HPF) and comparing the remaining signal to a specified threshold level is generally used as the noise detecting circuit 109.

However, the spectrum of a digital signal after demodulation has a frequency component up to B/2 frequency band, so that detection by the squelch circuit becomes impossible. Namely, although a digital modulation signal is received with an instruction for receiving signal strength (RSSI) detected by the RSSI circuit 110, detection by a squelch circuit is not performed.

Namely, a normal analog modulated signal can be detected by either the noise detecting circuit 109 or the RSSI detecting circuit 110, but a digital modulation signal can not be detected by the noise detecting circuit 109; it is detected only by the RSSI detecting circuit 110. For this reason, whether a received signal is an analog modulation signal or a digital modulation signal can be checked according to the logic of the combination shown in the table in FIG. 2.

Figure 4:
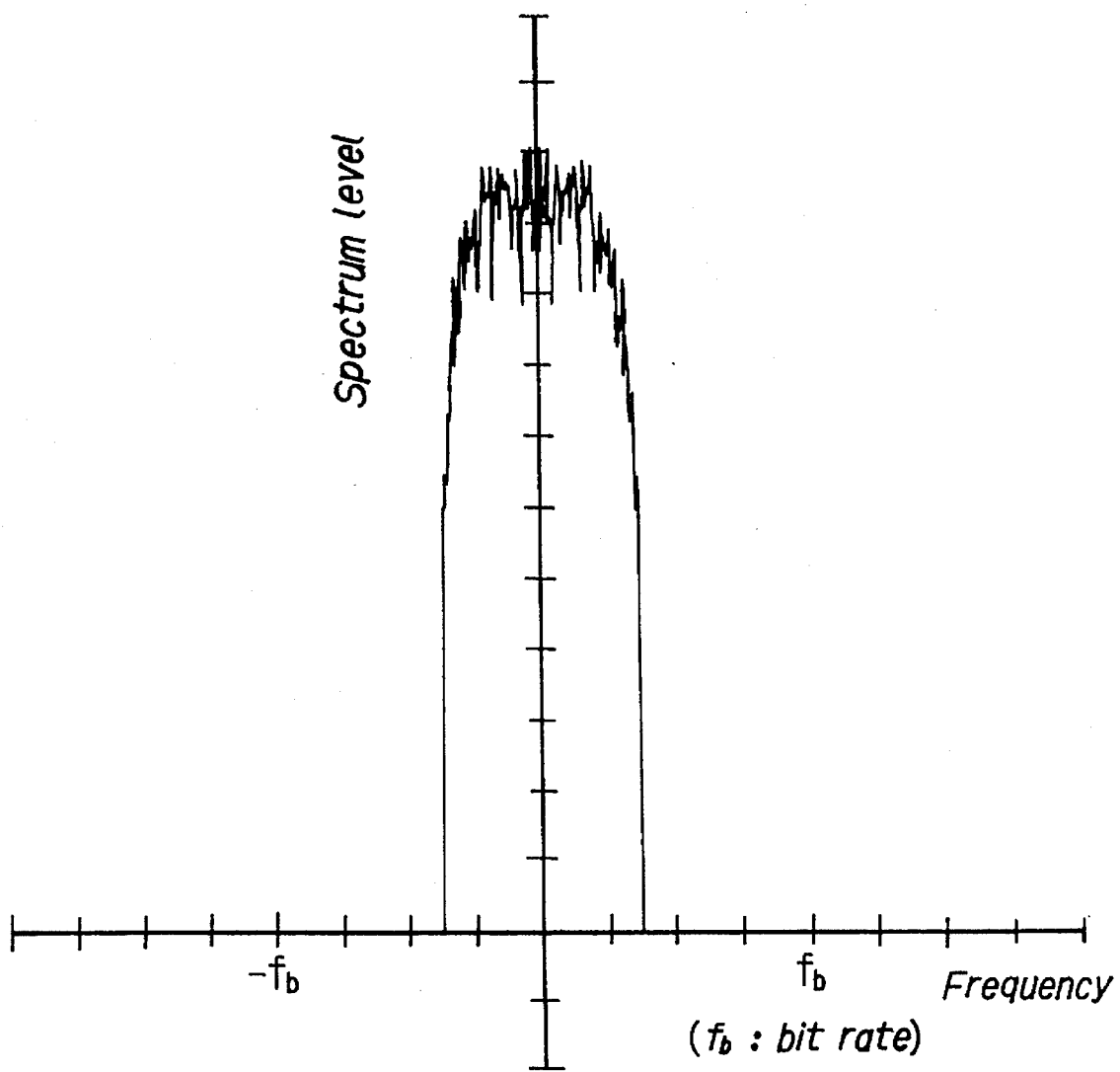
FIG. 4 shows the spectrum characteristics of a digital modulation signal from a π/4 shift QPSK.
Figure 5:
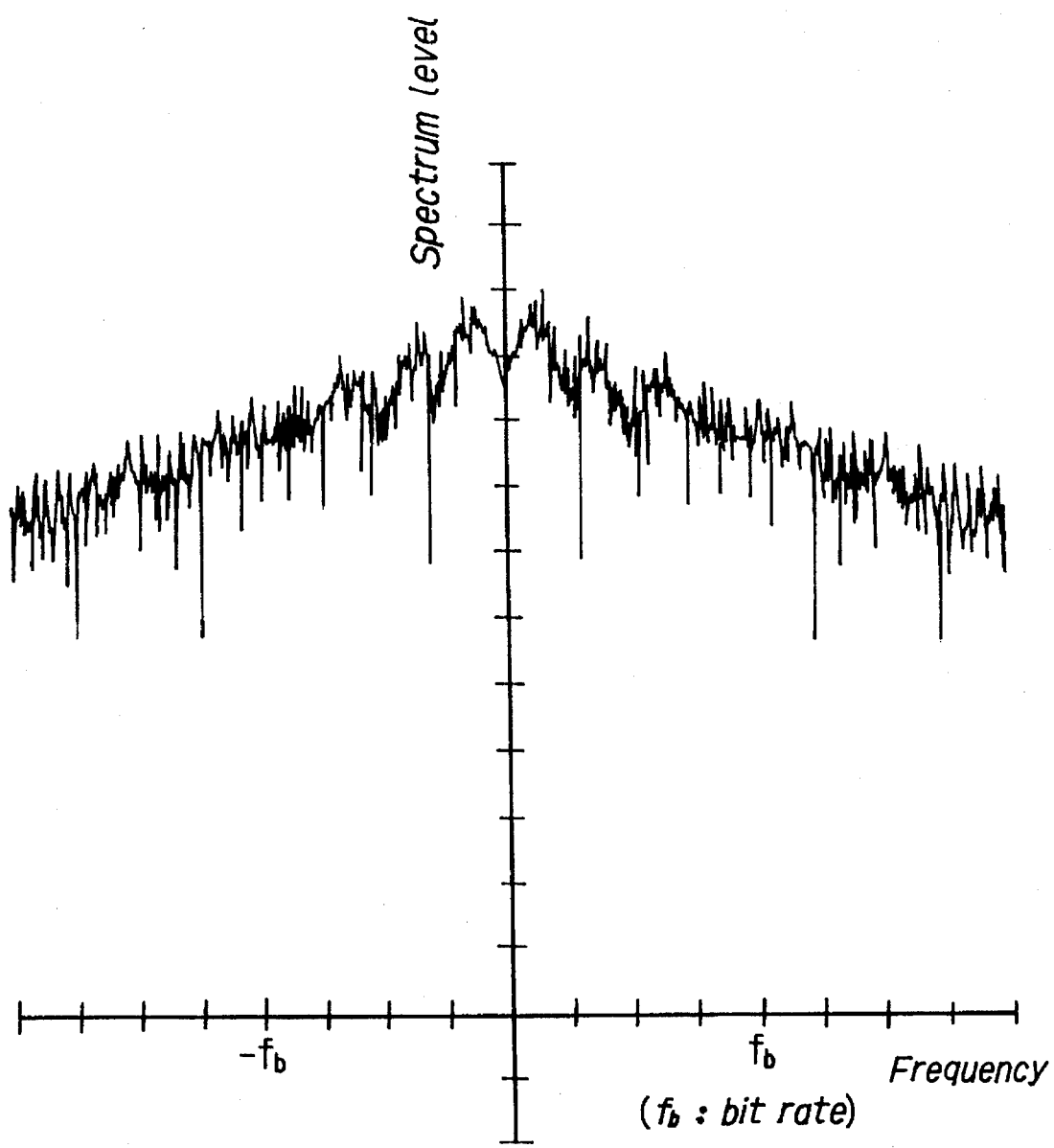
FIG. 5 shows the spectrum characteristics of the digital modulation signal, shown in FIG. 4, after frequency detection.

As an example of a digital modulation signal, the spectrum characteristics in π/4 shift QPSK (Quadrature Phase Shift Keying) is shown in FIG. 4. The spectrum characteristics, after the digital modulation signal is subjected to frequency detection, are shown in FIG. 5. As shown in this figure, the spectrum after frequency detection extends up to a high frequency component, which indicates that the method for detection and determination in this embodiment is effective.

As shown above, with the analog/digital receiver according to the present invention, a noise component, output from the FM signal detecting circuit 107, is detected in the noise detecting circuit 109 and the received signal strength in the RSSI circuit 110, respectively. Whether the received input signal is an analog modulation signal or a digital modulation signal is checked according to combinations of results of the detection above, so that the received input can automatically be discriminated with a simple configuration and moreover at a high speed. The signal detection output thus correctly corresponding to a received signal being selected. Also whether a received signal is an analog modulation signal or a digital modulation signal can be checked at a high speed even in a receiver executing high speed channel scan.

Figure 6:
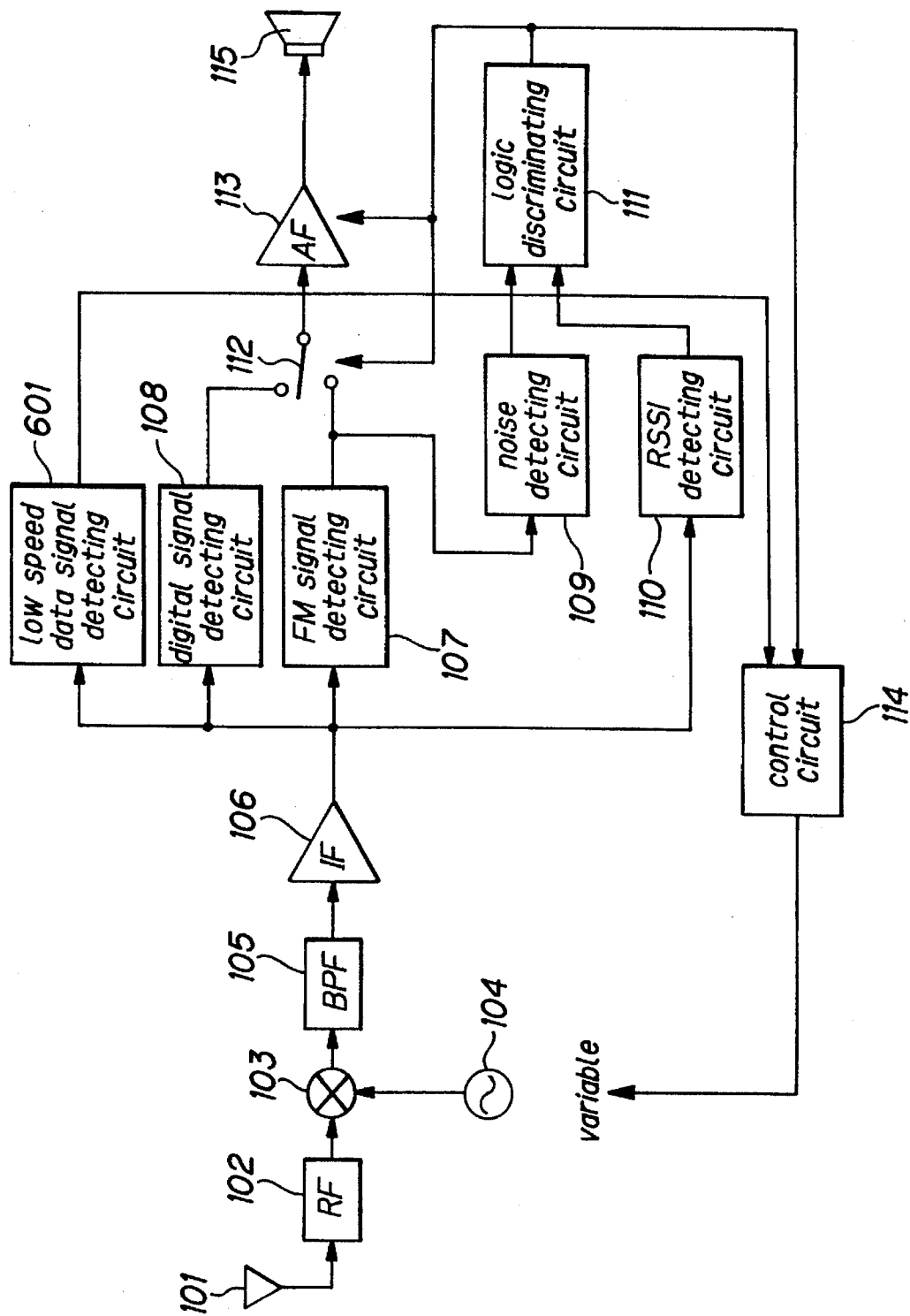
FIG. 6 is a block diagram of an analog/digital receiver according to Embodiment 2 of the present invention.

FIG. 6 is a block diagram of an analog/digital receiver according to Embodiment 2 of the present invention. In this figure, the same reference numerals are assigned to the same portions as those in FIG. 1 (Embodiment 1), and description thereof is omitted herein.

In FIG. 6, the analog/digital receiver, according to the present invention, comprises a receiving means, a digital signal detecting circuit 108, an FM signal detecting circuit 107, a noise detecting circuit 109, an RSSI detecting circuit 110, a logic discriminating circuit 111, a select switch 112, an aural frequency amplifier 113, a control circuit 114, a speaker 115, and a low speed data signal detecting circuit (low speed data signal detector) 601.

The low speed data signal detecting circuit 601 detects the presence of a signal having a frequency less than a specified level output from the receiving means after FM signal detection. The control circuit 114 controls an oscillation frequency from the local oscillator 104 according to the result of the detection by the low speed data signal detecting circuit 601 as well as by the logic discriminating circuit 111.

The analog/digital receiver, according to the present embodiment, detects a noise component in the output from the FM signal detecting circuit 107 in the noise detecting output circuit 109 as in Embodiment 1. In addition, receiving signal strength is detected by the RSSI detecting circuit 110, and a determination as to whether the received input is an analog modulation signal or a digital modulation signal is made by the logic discriminating circuit 111 according to the result of the detection by these circuits. The output from the digital signal detection circuit 108 or the output from the FM signal detecting circuit 107 is selected by the select switch 112 according to the result of the determination above.

Incidentally, in a low bit rate FSK (Frequency Shift Keying) signal from a pager or the like, extension of the signal spectrum after signal detection is small, and differentiation from an aural signal is difficult. For this reason, if the noise detecting signal 109 is realized with a squelch circuit, squelch becomes extended.

Figure 7:
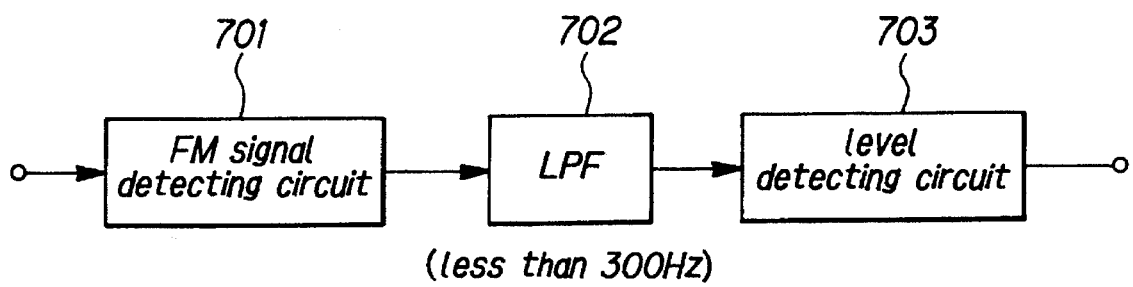
FIG. 7 is a block diagram of a low speed data signal detecting circuit according to Embodiment 2.

For this reason, in this embodiment, the low speed data signal detecting circuit 601 is added to Embodiment 1. FIG. 7 is a block diagram of the low speed data signal detecting circuit 601. As shown in the figure, the low speed data signal detecting circuit 601 comprises an FM signal detecting circuit 701, low pass filter (LPF) 702, and a level detecting circuit 703.

Figure 8:
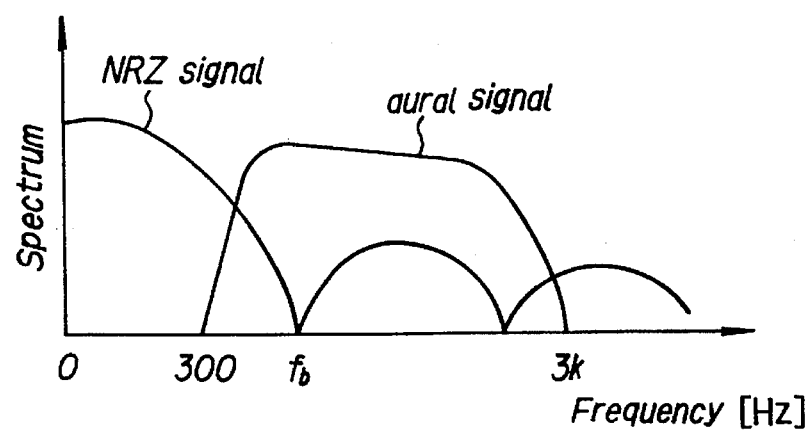
FIG. 8 shows the spectrum characteristics of a low speed data signal (NRZ signal) as well as of an aural signal.
Figure 9:
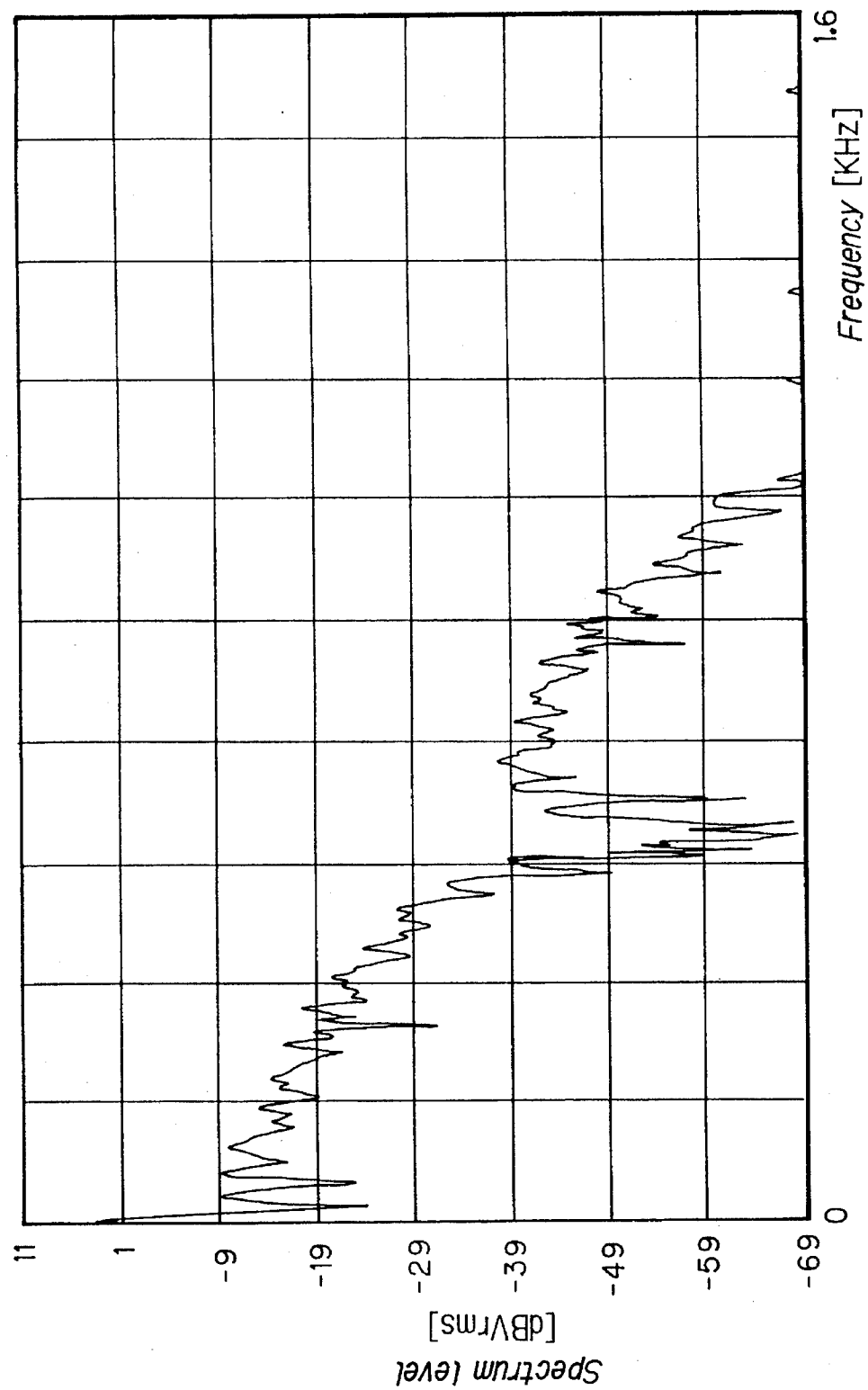
FIG. 9 is a graph for explanation of the result of spectrum measurement of an actual low speed data signal after FM signal detection.
Figure 10:
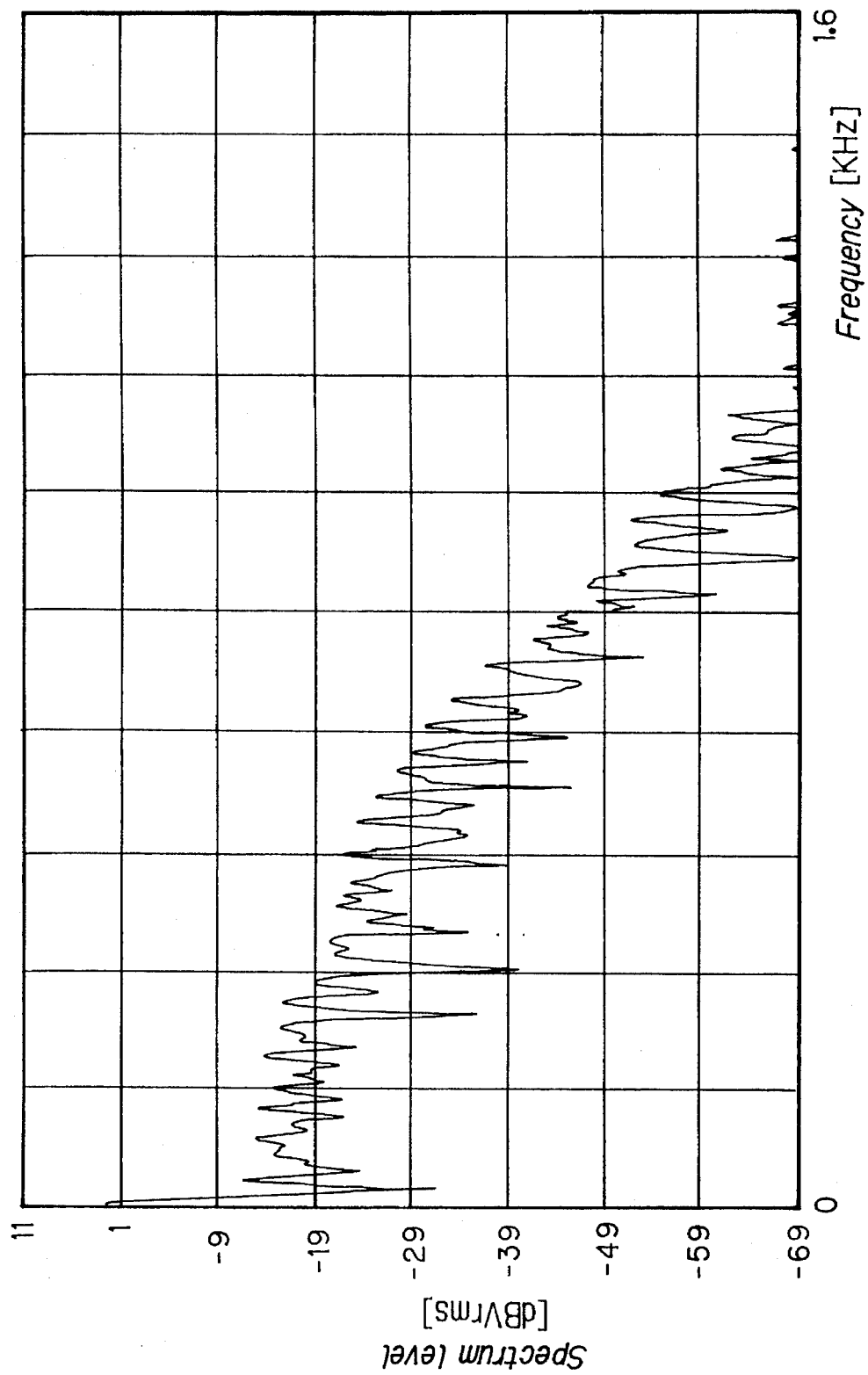
FIG. 10 is a graph for explanation of the result of spectrum measurement of an actual low speed data signal after FM signal detection.

FIG. 8 shows a comparison of the spectrum of a low speed data signal (NRZ signal) to that of an aural signal. FIG. 9 and FIG. 10 are graphs illustrating characteristics of spectrum measurement of an actual low speed data signal after FM signal detection. It should be noted that the result of measurement of the spectrum of an aural signal is well known and no description is provided herein.

As shown in FIG. 8, an aural signal has a spectrum in a band extending from 300 Hz to 3 KHz. In contrast, a low data signal (NRZ signal) has a spectrum extending beyond the frequency band of an aural signal (less than 300 Hz).

Thus, in the low speed data signal detecting circuit 601 according to the present invention, only a signal having a frequency less than, for instance, 300 Hz, is passed by the low pass filter 702, and spectrum level is detected by the level detecting circuit 703 so that differentiation of an aural signal from a low speed data signal, which has been difficult when executed with only the noise detecting circuit 109, can accurately be performed.

More specifically, determination is executed, for instance, according to the following principle.

(a) When a spectrum level less than 300 Hz is large:
low speed data signal; and
(b) When a spectrum level less than 300 Hz is small:
aural signal.

As described above, with the analog/digital receiver according to the present embodiment, a determination as to whether a received input is an analog modulation signal or a digital modulation signal can be executed even in the case of a received input which randomly will be an analog modulated signal or a digital modulated signal, with simple configuration at a high speed. Thus, the output of signal detection correctly corresponding to a receiving signal is selected.

As described above, with the analog/digital receiver according to the present invention, a noise component output from an analog signal detecting means is detected by a noise detecting means and received signal strength by the RSSI detecting means respectively. Determination as to whether the received input is an analog modulation signal or a digital modulation signal is made according to combinations of result of detection by the noise detecting means and the RSSI detecting means, so that it is possible to provide an analog/digital receiver which can automatically make a determination, even if an analog modulation signal or a digital modulation signal is received at random, as to whether the received input is an analog modulation signal or a digital modulation signal. This is performed with simple configuration at a high speed. Selection of signal detection correctly corresponding to the received signal as well a determination as to whether the received input is an analog modulation signal or a digital modulation signal is effectively made, even in a receiver executing high speed channel scan.

Also with the analog/digital receiver according to the present invention, the presence of a signal having a frequency less than a specified frequency output from the receiving means after analog signal detection is detected by a low speed data signal detecting means, and the oscillation frequency from a local oscillating means in the receiving means is controlled by a control means according to the result of the detection by the low speed data signal detecting means and the discriminating means. Thus, a determination as to whether the received input, including a low speed data signal, despite that it is difficult to discriminate it from the aural signal only with the noise detecting means, is an analog modulation signal or a digital modulation signal can be performed (even when received at random), with a simple configuration at a high speed, and signal detection correctly corresponding to the received signal can be selected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An analog/digital receiver comprising:

a receiver stage for a received signal;

a digital signal detector for detecting a digital signal output from said receiver stage;

an analog signal detector for detecting an analog signal output from said receiver stage;

a noise detector for determining whether a noise component output from said analog signal detector is not less than a specified value;

an RSSI detector for determining whether received signal strength output from said receiver stage is not less than a specified value;

a discriminator for making a determination as to whether said received input is an analog modulation signal or a digital modulation signal according to the determination made by said noise detector as well as by the RSSI detector; and a selector for selecting either the output from said digital signal detector or the output from said analog signal detector according to the result of determination by said discriminator.

2. An analog/digital receiver according to claim 1, wherein said receiver has a local oscillator for converting the frequency of said received signal, and said analog/digital receiver comprises a low speed data signal detector for detecting the presence of a signal having a frequency less than a specified frequency produced from said received signal by analog signal detection, and a controller for controlling the oscillation frequency of said local oscillator according to the result of detection by at least one of said low speed data signal detector and by said discriminator.

3. An analog/digital receiver according to claim 1, wherein said receiver stage comprises an antenna, a receiving circuit coupled to the antenna, a local oscillator in which an oscillation frequency is controlled under control by a controller, a mixer for mixing signal from said receiving circuit and oscillator, a band pass filter receiving an output signal from said mixer and an intermediate frequency amplifier for amplifying an output from said filter.

4. An analog/digital receiver according to claim 1, wherein said noise detector comprises a squelch circuit.

5. An analog/digital receiver according to claim 1, wherein said noise detector includes a squelch circuit and a band pass filter for detecting noise to make a cut-off frequency of the detector variable.

6. A method of processing analog and digital signals received by an analog/digital receiver, comprising:

(a) receiving the analog/digital signal;

(b) detecting a level of noise in any analog signal comprising the received signal;

(c) measuring signal strength of the received signal; and (d) determining whether the received signal contains an analog modulation signal on a digital modulation signal based on steps (b) and (c).

7. The method of claim 6, wherein the step of detecting noise level (b) includes band pass filtering the analog signal.

8. The method of claim 6, wherein said receiving step (a) includes converting the frequency of the received signal, and further including a step of detecting the presence of a signal having a data rate less than a specified rate in said analog signal, and in response, controlling the conversion frequency of said received signal.

* * * * *